United States Patent [19]

Woedl

[11] Patent Number: 4,504,103
[45] Date of Patent: Mar. 12, 1985

[54] COMBINATION ELECTRICAL OUTLET AND LOCK BOX

[76] Inventor: John Woedl, 4748 Booth Rd., Oxford, Ohio 45056

[21] Appl. No.: 420,808

[22] Filed: Sep. 21, 1982

[51] Int. Cl.³ ............................................ H01R 13/44
[52] U.S. Cl. .................................... 339/34; 339/45 R; 339/122 R
[58] Field of Search ...................... 339/34, 35; 109/23, 109/47, 50, 54

[56] References Cited

U.S. PATENT DOCUMENTS

| 916,436 | 3/1909 | Greenfield | 109/47 |
| 2,737,910 | 3/1956 | Shuman | 109/47 |
| 3,433,886 | 3/1969 | Myers | 339/34 |
| 3,609,647 | 9/1971 | Castellano | 339/122 |
| 3,794,956 | 2/1974 | Dubreuil | 339/34 |
| 3,999,493 | 12/1976 | Gulya | 109/23 R |
| 4,059,321 | 11/1977 | Rasmussen et al. | 339/34 |
| 4,083,314 | 4/1978 | Garvin | 109/50 |

Primary Examiner—Joseph H. McGlynn
Assistant Examiner—David L. Pirlot
Attorney, Agent, or Firm—Sandler and Greenblum

[57] ABSTRACT

A combination lock box and electrical outlet assembly is provided which is adapted to be positioned behind a wall or panel of a building. The assembly comprises an outer sleeve having at least one open end and an upper wall, and an inner lock box which is slideably received within the outer sleeve through its open end. The lock box has front and rear ends, an outlet face plate attached to the front end, and a releasable latching mechanism for locking the lock box within the outer sleeve. The latching mechanism comprises engaging elements positioned on the lock box and sleeve. A spring for biasing the lock box outwardly from both the outer sleeve and the wall or panel when the latching mechanism is released is also included. The rear of the lock box is provided with a male plug and the inner surface of the rear of the outer receptacle is provided with a female electrical receptacle to receive the plug so that when the lock box and outer receptacle are latched together, the plug will be inserted into the female receptacle and the outlets on the face plate will be electrically operable, thus camouflaging the existence of the lock box.

8 Claims, 7 Drawing Figures

COMBINATION ELECTRICAL OUTLET AND LOCK BOX

BACKGROUND OF THE INVENTION

1. Technical Field of the Invention

The present invention generally relates to a combination electrical outlet and lock box, and more specifically to a combination electrical outlet and lock box in which an outlet cover, which can either be operative or inoperative, masks the location of a lock box behind a building wall.

2. Discussion of Prior Art

The prior art includes several attempts to provide concealed safes or other lock boxes behind an outlet in a building wall. All of these devices, however, are incapable of being electrically operable, and merely serve as phony outlets to conceal useable safes or lock boxes.

GARVIN, U.S. Pat. No. 4,083,314, discloses a wall depository which is asserted to be an advancement over prior depositories which employ an electrical outlet cover for disguise, and which use a complete electrical outlet which is functional except for the omission of structure capable of providing a final electrical connection. The depository incorporates a receptacle box which is mounted behind a building wall. The depository container or lock box is slidably received in the receptacle box, which in turn frictionally grabs the side walls of the container. To insert a receptacle box within a wall, a hole is cut into the wall, and the box inserted until its flanges abut the wall surface. Retaining ears are then pushed from the inside of the receptacle into horizontal slots along the sides of the box. The device includes concealing means in the form of a simulated electrical receptacle outlet which is attached to a vertical side wall in the depository container by a screw and nut combination.

GULYA, U.S. Pat. No. 3,999,493, discloses a dummy electrical outlet which hides a safe or vault. A safe is mounted in a building wall and fits within a recess between adjacent walls. The safe includes a repository section and a cover plate which appears to be an ordinary electrical outlet assembly. The safe unit is inserted through a sleeve and secured by a panel which is larger than both the sleeve and the hole or recess in the wall. Rotation of a plug moves a latch so that the entire safe assembly can be removed from the wall. The entire repository unit can be rotated upon release by an appropriate latch mechanism.

SHUMAN, U.S. Pat. No. 2,737,910, discloses a catapult cartridge safe which includes an outward biasing spring. The apparatus comprises a safe which is mounted within a building and which slidably encloses a receptacle to be projected exteriorly of a building wall. The building wall has an opening which is closed by a door; the door has a plurality of releasable latches so that it can be manually inserted within an opening at any desired time. The safe comprises an outer receptacle and an inner receptacle; an alarm is also provided and is energized when a fire or unauthorized movement of an inner container is detected. Upon the occurrence of such a condition, a fusible cord is severed and a spring serves to catapult the inner receptacle outwardly from the outer receptacle and through an opening in the building wall.

CASTELLANO, U.S. Pat. No. 3,609,647, discloses a conventional electrical power box having flanges and top and bottom walls. The bottom wall of the outlet receives power lines and a ground line. The device also includes a cover plate which is adapted to receive a receptacle plug, which includes a pair of male members; the male members are adapted to be inserted into a complementary pair of female apertures.

GREENFIELD, U.S. Pat. No. 916,436, discloses a junction box comprising a pair of side walls. A bottom portion of the box can be separated from the side walls by pressing arms of a spring inwardly until the ears release the side walls. Plugs located in a rectangular box portion are then removed, and the box can be installed in the wall opening by loosening screws until they release clamping members and until the screws are withdrawn through respective openings in the side wall of the box.

None of the prior art devices discloses the specific structure of the receptacle of the present invention, which includes but is not limited to its particular male-female connectors, a mechanical locking element, an outwardly biasing spring, and a specific structural relationship between the locking pin and a screw on the outlet plate. Furthermore, none of these patents discloses the concept of providing a combination lock box/safe which is capable of also acting as a conventional electrical receptacle.

SUMMARY OF THE INVENTION

It is accordingly a general object of the present invention to provide a new and improved combination lock box and electrical outlet which is capable of functioning as a conventional electrical outlet.

It is an additional object of the present invention to provide a new and improved combination lock box and electrical outlet that is sufficiently large so as to hold a bank money deposit bag, legal sized papers, a jewelry case, or a sizable amount of loose jewelry or money.

A further object of the present invention is to provide a new and improved combination lock box and electrical outlet which is adapted to be installed behind a T-wall, i.e., behind a wall which is connected to a main building wall in perpendicular fashion.

Still another object of the present invention is to provide a new and improved combination lock box and electrical outlet which when inserted into a wall, camouflages the existence of the safe and appears to be merely a conventional electrical outlet.

Another object of the present invention is to provide a new and improved combination lock box and electrical outlet which is capable of functioning either as a conventional electrical outlet or as an inoperable outlet.

Yet a further object of the present invention is to provide a new and improved combination lock box and electrical outlet which can be easily removed from behind a wall or panel in order to provide access to any valuable goods, papers, or other articles which may be contained in the receptacle.

The present invention is provided for in a first aspect thereof by combination lock box and electrical outlet assembly which is adapted to be positioned behind a building wall or panel. An outer sleeve is adapted to be placed behind such a wall or panel and includes a live electrical receptacle. The assembly also includes a lock box adapted to be positioned within the outer sleeve, the lock box including both a face plate with at least one electrical outlet and electrically conductive means attached to the outlet within the lock box. The electrically conductive means comprise a plug adapted to be inserted into the live electrical receptacle when the lock box is positioned within the outer sleeve, whereby only the face plate will be visible from the exterior of the wall or panel in order to camouflage the existence of the lock box behind said wall or panel.

The present invention is provided for in a second aspect thereof by a combination lock box and electrical outlet assembly which is adapted to be positioned behind a building wall or panel. The assembly comprises an outer sleeve having at least one open end and an upper wall, and an inner lock box slidably received within said outer sleeve through said open end. The lock box has front and rear ends and an electrical outlet faceplate attached to the front end adjacent to the open end of said outer sleeve. A releasable latching mechanism for locking the lock box within the outer sleeve comprises engaging elements positioned on the sleeve and on the lock box. Biasing means are provided for forcing the lock box outwardly of the outer sleeve when the latching mechanism is released.

Upon further study of the specification and appended claims, additional objects, features and advantages of the present invention will become more fully apparent to those skilled in the art to which this invention pertains.

BRIEF DESCRIPTION OF THE DRAWINGS

The above and other objects, features, and advantages of the present invention will become more apparent to those of ordinary skill in the art to which this invention pertains from the following detailed description, when considered in connection with the accompanying drawings, in which like reference characters designate corresponding parts throughout the several views, and wherein.

DETAILED DESCRIPTION OF THE DRAWINGS

Figure 1:
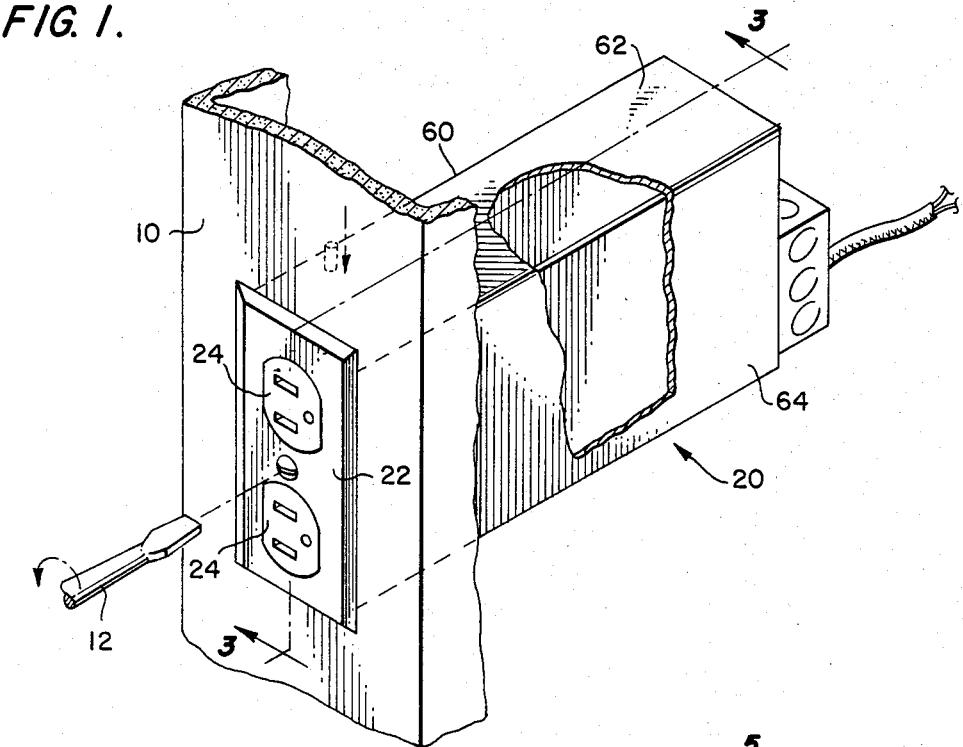
FIG. 1 is a perspective view of the combination electrical outlet and lock box assembly of the present invention in its locked (camouflage) position behind a building wall or panel.

Referring now more specifically to FIG. 1, the combination lock box and electrical outlet assembly 20 of the present invention is illustrated as being positioned behind a building wall or panel 10. FIG. 1 illustrates the assembly in its concealed or camouflaged position. In this position, faceplate 22 is substantially flush with the surface of the wall or panel 10, and to all outward appearances seems to represent a conventional electrical outlet. It perfectly camouflages the existence of lock box 42 behind the wall, as well as the existence of any valuable contents, e.g., articles, 54 or 56, which may be located in the lock box. As further shown in FIG. 1, conventional female outlets 24 are positioned in apertures in face plate 22.

The combination assembly includes an outer receptacle or sleeve 60, having an upper wall 62, side walls 64 and 65, and bottom wall 66. As shown in dotted lines in FIG. 1, a locking pin 37, attached to lock box 42 and described in greater detail hereinafter, is adapted to protrude through aperture 68 in upper wall 62. This is best illustrated in FIG. 4.

Figure 2:
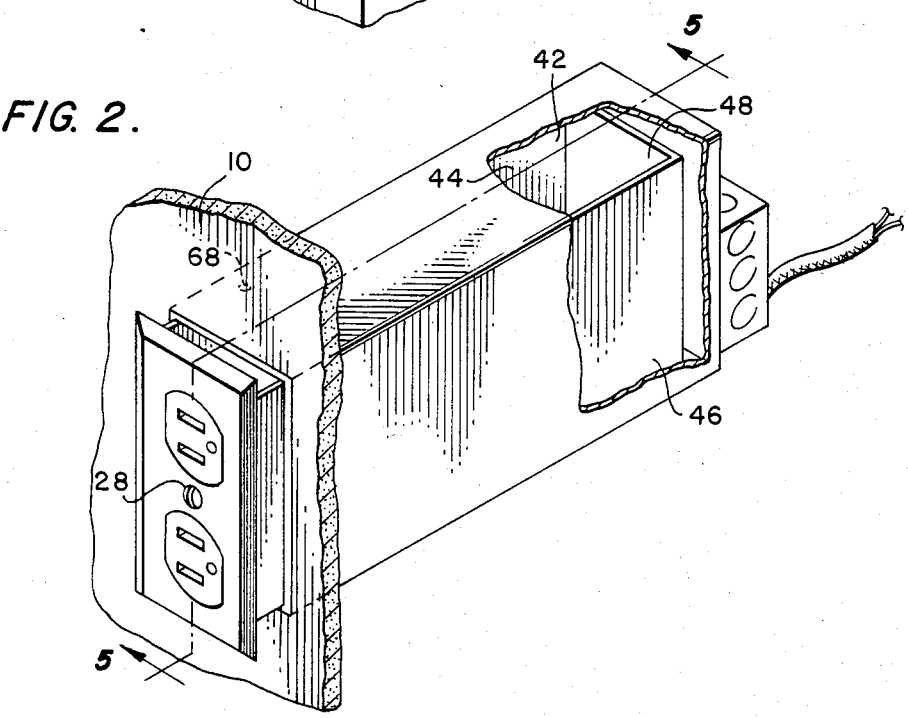
FIG. 2 is a perspective view similar to that of FIG. 1 but illustrating the assembly when the lock box and outer sleeve are in an unlatched position, the lock box being shown as extending outwardly from the building wall or panel.
Figure 5:
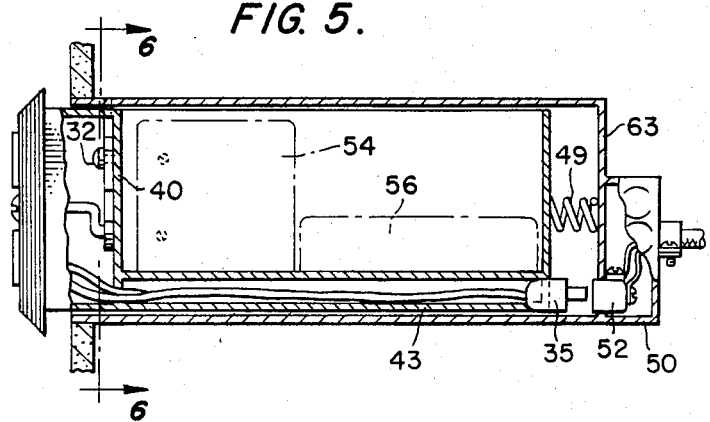
FIG. 5 is a sectional view of the assembly illustrated in FIG. 2 taken along line 5—5.

As illustrated in FIG. 2, when the latching mechanism, which comprises upper wall aperture 68 and latching pin 37, is released, spring 49, which is best shown in FIG. 5, serves to bias the inner receptacle or lock box 42 outwardly from both sleeve 60 and panel or wall 10 to provide access to the valuable contents of the inner box. The precise structure for releasing the latching mechanism will be discussed in detail hereinafter.

Figure 3:
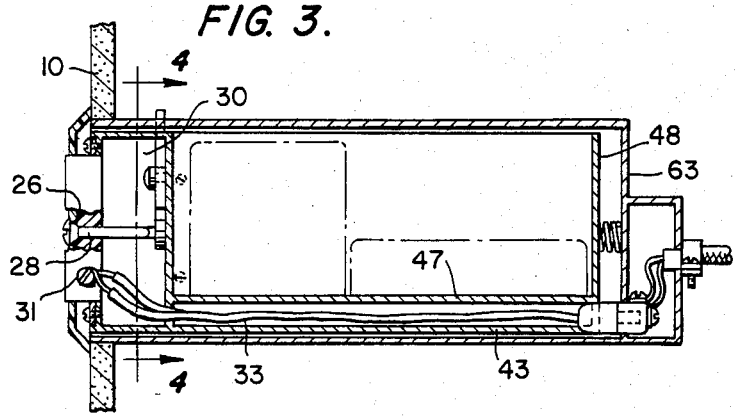
FIG. 3 is a sectional view of the assembly taken along line 3—3 in FIG. 1.

As shown, lock box 42 includes side walls 44 and 46, false bottom 47, bottom wall 43, rear wall 48, and medial inner wall 40, which is best illustrated in FIGS. 3 and 5. Faceplate 22 and outlets 24 are retained on the front end of the lock box adjacent the open end of outer sleeve 60. FIGS. 3-6 illustrate in cross-section the construction of the outer sleeve and the inner lock box.

Figure 4:
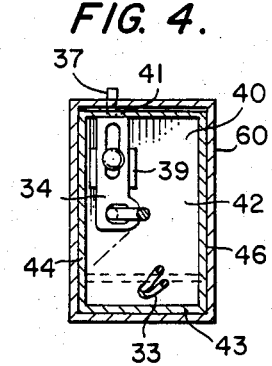
FIG. 4 is a cross-sectional view taken along line 4—4 of the assembly illustrated in FIG. 3.

FIGS. 3 and 4 illustrate the combination lock box and electrical outlet assembly in its latched condition, in which the lock box is positioned within the panel and slidably positioned within the outer sleeve.

The lock box includes a conventional electrical junction box 30, which is attached to face plate 22 by conventional means, i.e., by screws or other fastening elements. The junction box is positioned within the front end of the lock box, and its rear wall constitutes medial wall 40 of the lock box. A screw or other conventional contact 31 is provided on one or more of the outlets, and is connected to electrically conductive wires or cables 33, which extend below false bottom 47 of the lock box. The wires terminate in a conventional electric plug 35, as best illustrated in FIG. 5. This plug extends through an appropriately sized aperture in rear lock box wall 48.

Although the apparatus is shown as being electrically conductive, it is also possible to use the apparatus in a fashion such that the electrical outlet will be inoperable, e.g., by removing wire 47 or male plug 35, or by retracting or retaining these elements under false bottom 47 so that plug 35 will not engage female electrical receptacle 52, as discussed in greater detail hereinafter.

When the assembly is in its latched condition, as shown in FIG. 4, latching pin 37 extends upwardly through outer sleeve aperture 68 and through aperture 41, which is located at the top of the junction box and within the lock box. By extending through these apertures, the locking pin prevents sliding motion of the inner lock box with respect to the outer sleeves, and maintains the electrical contact which created by the engagement of male plug 35 and female electrical receptacle 52. Electrical receptacle 50 is positioned along the rear wall 63 of the outer sleeve, and preferably is in the form of a conventional electrical assembly connected to the remainder of the building electrical system. Male plug 35 and female receptacle 52 are positioned so that when the lock box and outer sleeve are in their latched condition, the male and female members will establish an electrical connection, and render outlets 24 electrically operable. In this fashion the present assembly provides both a hidden safe or vault area and an operable electric receptacle. As seen in FIG. 3, when the lock box and outer receptacle are engaged in their latched condition, helical spring 49 is compressed. The helical spring is attached in conventional fashion to the inner surface of rear wall 63.

Figure 7:
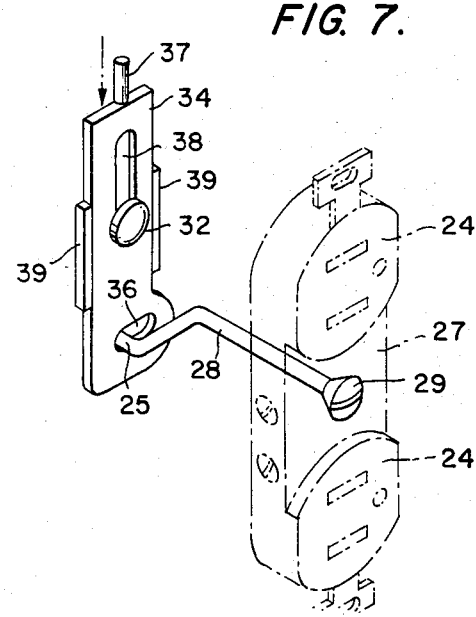
FIG. 7 is a perspective view of a portion of the latching mechanism of the present invention.

In FIG. 4, a main portion of the latching mechanism, which is described in greater detail hereinafter with respect to FIG. 7, is shown. The latching mechanism includes guide plate 34, guide rails 39, rivet 32, pin 37, and slots 36 and 38, which are located in guide plate 34.

Figure 6:
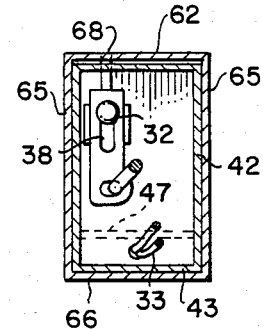
FIG. 6 is a cross-sectional view taken along line 6—6 of the assembly shown in FIG. 5.

FIGS. 5 and 6 illustrate in cross-section the apparatus of the assembly in its unlatched condition. In this position, when pin 37 is removed from aperture 68, the outward biasing force exerted by spring 49 forces lock box 42 outwardly from the outer sleeve and from wall or panel 10. This automatically disconnects plug 35 from female electrical receptacle 52, to thus eliminate any possibility of shock or other electrical damage to a user desiring access to the contents of the lock box. In this position, as shown in FIG. 6, guide plate 38 has moved downwardly so that the top of slot 38 will rest upon rivet 32.

The overall latching mechanism for this assembly is illustrated in FIG. 7. Outlets 24 are illustrated along with screw 28. Screw 28 includes a head portion 29 which extends through an aperture (not labelled) in outlet plate 27. In FIG. 7 the locking pin is illustrated in its uppermost, or latching, position, as in FIG. 4. To lower the locking pin, which will unlatch the lock box from the outer receptacle and allow it to be biased outwardly by the screw to provide access to its contents, it is necessary to use a screwdriver 12 to turn central screw 28. By turning the screw in a counter-clockwise direction, with respect to FIG. 7, generally L-shaped screw 28 will rotate and its leg 25, which is positioned within lower screw slot 36 of slidable guide plate 34, will be forced downwardly. The screw thus acts as a crank to force guide plate 34 downwardly through guide rails 39, which are attached to wall 40 in conventional fashion, e.g., by welding. As the guide plate slides downwardly through the guide rails, rivet 32 rides along upper guide slot 38 to provide a stop for both generally downwardly and upwardly vertical movement of the guide plate. Thus, by turning screw 28 in a counterclockwise direction, guide plate 34 is forced downwardly, and pin 37 is disengaged from aperture 68 of upper wall 62; in this manner, release of this latching mechanism allows the lock box and the outer wall to be separated.

Valuables, e.g., articles, 54 and 56, of any desired type can be placed within the inner lock box and remain hidden from sight behind the conventional appearing outlets 24 and faceplate 22.

The lock box can be installed behind any wall, including, e.g., a "T" wall, i.e., a wall positioned at right angles to a main wall behind it.

The front plate, which comprises a standard receptacle cover, can be fastened to the lock box by means of mastic or other conventional adhesive or fastening means. Although no specific dimensions are required for the present apparatus, in one embodiment the inner lock box is approximately 12 inches long, 4 inches high, and 2 inches wide. The wires and plug are covered by false bottom 47, which can be frictionally or otherwise conventionally positioned between side walls 44 and 46 of the lock box. The outer sleeve can be formed from any desired material, e.g., aluminum, plastic, and is preferably formed from fire-proof material.

From the above it is clear that the present structure provides a safe hiding place for jewels, money, and other valuables, and it will not be obvious to thieves. Instead, each lock box will appear to be a conventional electrical outlet covered by an attractive face plate. If desired, the apparatus can either be provided with mating male and female plugs, so that the outlet will be electrically operable, or can be sold without plug 35 and wires 33 in order to simply provide a false electrical outlet and a camouflaged safe or vault for hiding valuables.

From the above, it is obvious that the present invention can be provided for in various embodiments and modifications and is not limited to the specific embodiment disclosed herein.

What is claimed is:

1. A combination lock box and electrical outlet assembly which is adapted to be positioned behind a wall or panel, said assembly comprising:
   (a) an outer sleeve having at least one open end and an upper wall, said outer sleeve comprising first and second rear walls, a bottom wall, and a rear wall, said rear wall including a live electrical outlet connected to the electrical system of a building;
   (b) a lock box slidably received within said outer sleeve through said open end, said lock box having front and rear ends, and an electrical outlet faceplate attached to said front end adjacent to said open end;
   (c) a releasable latching mechanism for locking said lock box within said outer sleeve, said latching mechanism comprising engaging elements positioned on said lock box and said sleeve; and
   (d) means for biasing said lock box outwardly of the sleeve when the latching mechanism is released.

2. A combination lock box and electrical assembly in accordance with claim 1, wherein said outer sleeve upper wall has a locking aperture, and wherein a movable locking pin is attached to said lock box, said pin adapted to be removably inserted within said locking aperture to lock said lock box within said outer sleeve and behind said wall or panel.

3. A combination lock box and electrical outlet assembly in accordance with claim 2, further comprising a screw attached to said faceplate and means for indirectly linking movement of said screw to movement of said locking pin, whereby when the head of said screw is rotated, said pin is moved in a generally vertical direction into or out of engagement with said locking aperture, dependent upon the direction of rotation of said screw.

4. A combination lock box and electrical outlet assembly in accordance with claim 3, wherein said linking means comprise a rivet and a pair of guide rails attached to a medial wall of said lock box, a guide plate slidably retained within said rails, said guide plate comprising a lower slot for receiving a free end of said screw, said screw being generally L-shaped and having a leg extending into said slot, and an elongated upper slot positioned about said rivet, wherein said locking pin extends generally vertically upwardly from said guide plate.

5. A combination lock box and electrical outlet assembly in accordance with claim 3, further comprising a spring attached to a rear wall of said outer receptacle, said spring being adapted to bias said lock box outwardly from said outer receptacle and from said panel or wall when said latching mechanism is released and said pin removed from said aperture.

6. A combination lock box and electrical outlet assembly which is adapted to be positioned behind a wall or panel, said assembly comprising:
   (a) an outer sleeve having at least one open end and an upper wall;
   (b) a lock box slidably received within said outer sleeve through said open end, said lock box having front and rear ends, and an electrical outlet faceplate attached to said front end adjacent to said open end, an electrical wire being connected to said faceplate at one end and to a plug at a second end, said plug adapted to be inserted into a live electrical outlet in said outer sleeve when a releasable latching mechanism locks said box within said outer sleeve, said latching mechanism comprising engaging elements positioned in said lock box and on said sleeve; and
   (c) means for biasing said lock box outwardly of the sleeve when the latching mechanism is released.

7. A combination lock box and electrical outlet assembly in accordance with claim 6, wherein said lock box includes a lower wall and a false bottom wall, said false bottom wall being spaced upwardly from said lower wall, said plug and said wire being positioned between said false bottom wall and said lower wall.

8. A combination lock box and electrical outlet assembly which is adapted to be positioned within a wall or panel, said assembly comprising:
   (a) an outer sleeve adapted to be positioned behind said wall or panel, said outer sleeve including a live electrical receptacle;
   (b) an inner lock box adapted to be slidably positioned within said outer sleeve, said lock box including both a faceplate with at least one electrical outlet and electrically conductive means which are attached to said outlet, said electrically conductive means comprising a plug which is adapted to be inserted into said live electrical receptacle when said lock box is positioned within said outer sleeve, whereby only said face plate will be visible from the exterior of said panel or wall and will thus camouflage the existence of said lock box behind said wall, said assembly further comprising means for biasing said lock box into a position in which it is telescoped outwardly of said sleeve to disconnect said plug from said live electrical receptacle, said plug being disconnected from said electrical receptacle when said lock box is telescoped outwardly from said outer sleeve.

* * * * *